United States Patent [19]

Takada

[11] Patent Number: 4,862,254
[45] Date of Patent: Aug. 29, 1989

[54] COLOR FACSIMILE MACHINE WITH A COLOR SELECTION FUNCTION

[75] Inventor: Toshiyuki Takada, Hadano, Japan
[73] Assignee: Ricoh Company, Ltd., Tokyo, Japan
[21] Appl. No.: 277,499
[22] Filed: Nov. 30, 1988

Related U.S. Application Data

[63] Continuation of Ser. No. 117,512, Nov. 6, 1987, abandoned.

[30] Foreign Application Priority Data

Nov. 6, 1986 [JP] Japan ................................. 61-262638

[51] Int. Cl.⁴ .......................... H04N 1/46; H04N 1/32
[52] U.S. Cl. ........................................ 358/75; 358/434
[58] Field of Search ...................... 358/75, 78, 80, 257, 358/258

[56] References Cited

U.S. PATENT DOCUMENTS

| | | | |
|---|---|---|---|
| 4,467,348 | 8/1984 | Fujii et al. | 358/78 |
| 4,583,100 | 4/1986 | Tazaki | 358/75 |
| 4,668,978 | 5/1987 | Gokita | 358/78 |
| 4,674,861 | 6/1987 | Kawamura | 358/75 |

FOREIGN PATENT DOCUMENTS 2165678  4/1986  United Kingdom ................. 358/78

Primary Examiner—James J. Groody
Assistant Examiner—Randall S. Svihla
Attorney, Agent, or Firm—Oblon, Spivak, McClelland, Maier & Neustadt

[57] ABSTRACT

A color facsimile machine includes a three-color plotter for recording image information received from a transmitter. Even if the transmitter is a monochroic facsimile machine so that image information received is monochroic, the present color facsimile machine records the image information with a preselected color. In addition, if image information received is multi-color image information, then the present color facsimile machine can record the image information in accordance with the color of an original image. Besides, it may also be so set to record any accompanying information, such as identification of the transmitter and data or time of reception, with a preselected color.

7 Claims, 4 Drawing Sheets

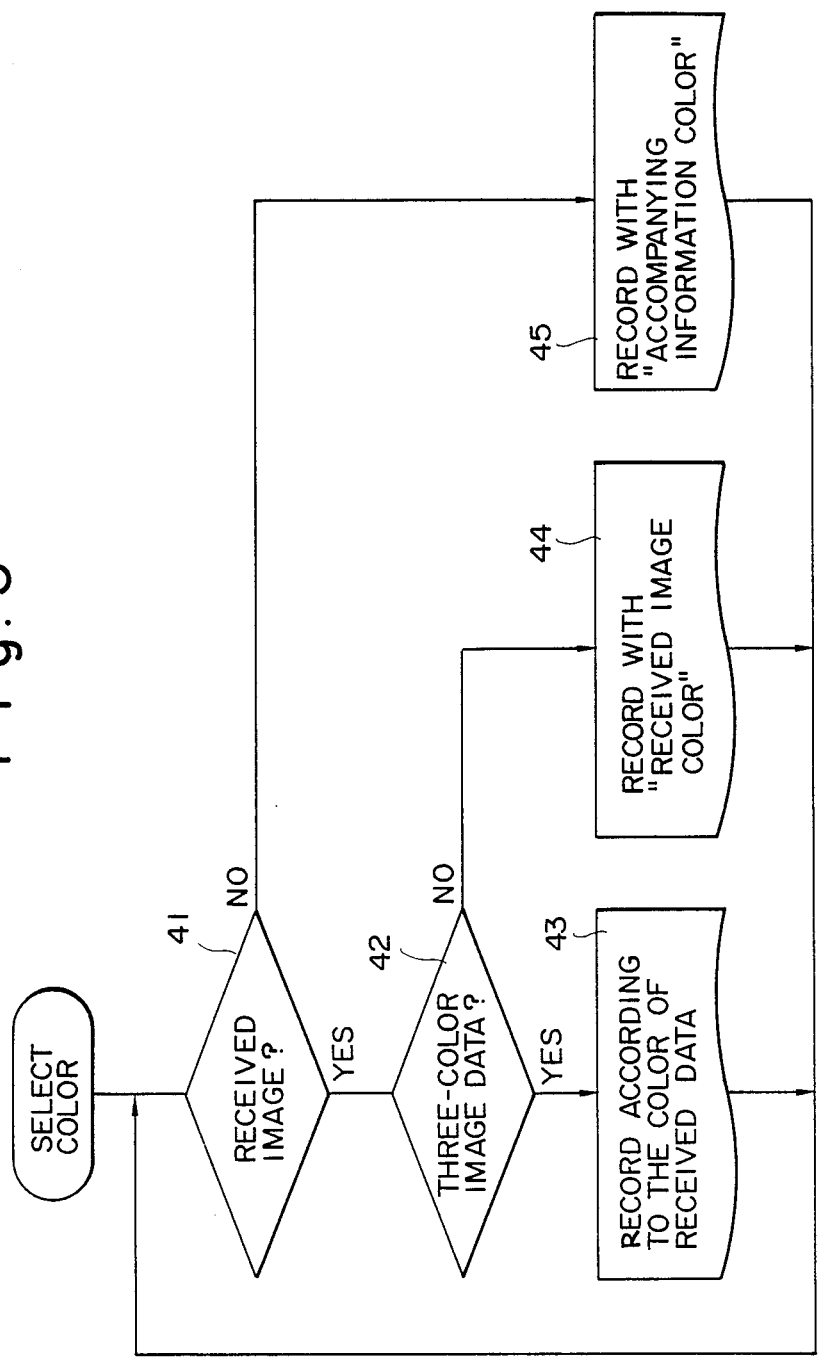

COLOR FACSIMILE MACHINE WITH A COLOR SELECTION FUNCTION

This application is a continuation of application Ser. No. 117,512, filed on Nov. 6, 1987, now abandoned.

BACKGROUND OF THE INVENTION

1. Field of the Invention

This invention generally relates to a recording apparatus, and, in particular, to a color recording apparatus suitable for use in a facsimile machine. More specifically, the present invention relates to a color facsimile machine capable of recording a multi-color image.

2. Description of the Prior Art

A color facsimile machine capable of optically reading a color original image with two or three colors, transmitting color image data and recording a received image with original colors as read is being developed. When such a color facsimile machine receives image information transmitted from a monochroic facsimile machine which reads an original image as a black and white image, a received image data is recorded as a black and white image in compliance with a transmitter. However, if such a color facsimile machine has a function capable of recording an image, for example, with three colors, it would be much more convenient if a received image can be recorded with two or more colors, such as blue and red, as desired by an operator.

SUMMARY OF THE INVENTION

In accordance with the present invention, there is provided a color facsimile machine capable of recording an image with one or more selected colors as desired. That is, a color facsimile machine of the present invention is capable of recording a received image with a plurality of colors in accordance with color information of the original image. In addition, in accordance with the present invention, a received image may be recorded with a selected color or colors in a desired portion or portions thereof. For example, accompanying data, such as date of transmission, identification of transmitter and page number, may be advantageously recorded with a selected color different from the color recording the text portion of a received image.

It is therefore a primary object of the present invention to obviate the disadvantages of the prior art as described above and to provide an improved facsimile machine capable of recording an image with one or more selected colors.

Another object of the present invention is to provide a color recording apparatus suitable for use in a facsimile machine.

A further object of the present invention is to provide a color facsimile machine capable of recording a received image transmitted from a transmitter in accordance with the color information of an original read by the transmitter.

A still further object of the present invention is to provide a color facsimile machine capable of recording data with one or more selected colors selected by an operator.

A still further object of the present invention is to provide a color facsimile machine capable of providing an output recorded in color which is easy to read.

Other objects, advantages and novel features of the present invention will become apparent from the following detailed description of the invention when considered in conjunction with the accompanying drawings.

BRIEF DESCRIPTION OF THE DRAWINGS

FIG. 5 is a flow chart showing the sequence of steps to determine a recording color in accordance with the principle of the present invention.

DESCRIPTION OF THE PREFERRED EMBODIMENTS

In accordance with the principle of the present invention, setting means is provided for previously setting a color to be used for recording a received image. In the case when a color image data of a plurality of colors has been received from a transmitter, the received image is recorded in accordance with the color information of the received image data; whereas, in the case when a monochroic image data has been received, the received image data is recorded using a color previously set by the setting means.

Figure 1:
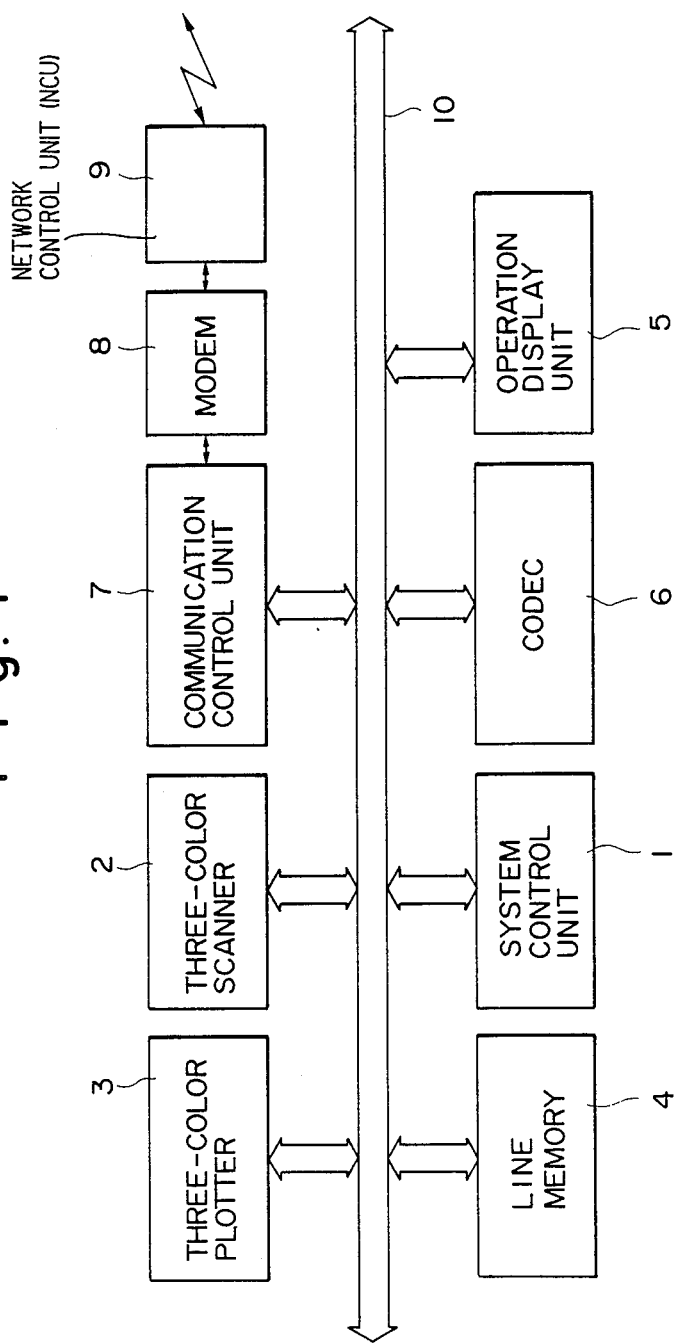
FIG. 1 is a block diagram showing the overall system architecture of a color facsimile machine constructed in accordance with one embodiment of the present invention.

Referring now to FIG. 1, there is shown in block form a color facsimile machine constructed in accordance with one embodiment of the present invention. As shown, the present color facsimile machine includes a system control unit 1 in charge of the overall control of the present facsimile machine, a three-color scanner 2 for optically reading an original image with three predetermined colors, e.g., black, blue and red, with a predetermined resolution, a three-color plotter 3 for recording a received image or any information to be recorded with one or more of predetermined three colors, e.g., black, blue and red, with a predetermined resolution, and a line memory 4 for temporarily storing one line of data of received information or the like.

Also provided in the present color facsimile machine is an operation display unit 5 which is provided with various kinds of operation keys, indicators and displays and which is to be used for setting desired operations to be carried out by the present facsimile machine in accordance with guidance information or the like displayed. The present facsimile machine also includes a codec 6 for coding image data to be transmitted to a remote receiver so as to have the image data compressed or decoding compressed image data received from a remote transmitter. Also provided is a communication control unit 7 which carries out communication of image data with another facsimile machine at a remote place by executing a predetermined facsimile communication control procedure. A modem 8 is also provided for modulating and demodulating image data for transmission of image data using the public telephone line network, which is an analog network, as a communication network. Moreover, a network control unit 9 is also provided for establishing connection between the present facsimile machine and the public telephone network. As shown in FIG. 1, the system control unit 1, three-color scanner 2, three-color plotter 3, line memory 4, operation display unit 5, codec 6 and communication control unit 7 are all connected to a system bus 10, through which data is transferred among those elements.

Figure 2:
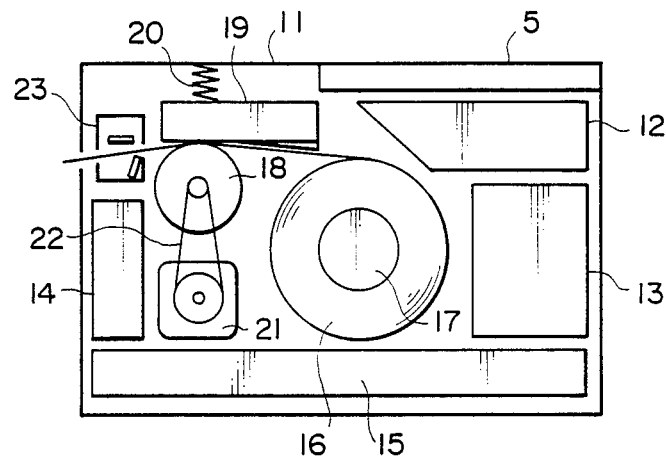
FIG. 2 is a schematic illustration showing the overall physical structure of the color facsimile machine of FIG. 1.

FIG. 2 schematically shows the physical structure of the present color facsimile machine. As shown, the present facsimile machine includes a housing 11 which houses therein the operation display unit 5 at its top and an automatic original feeding mechanism 12 disposed below the operation display unit 5. The three-color scanner 13 is disposed below the automatic original feeding mechanism 12. In addition, a power supply unit 14 is disposed at the left end in the interior of the housing 11, and a control unit 15 is disposed at the bottom of the housing 11. In addition, a roll of thermo- or heat-sensitive recording paper 16, which defines part of the three-color plotter 3, is mounted on a rotatably supported shaft 17 and located approximately at the center of the interior of the housing 11. The leading end of the recording paper unwound from the roll passes between a platen roller 18 and a thermal print head 19, which also define part of the three-color plotter 3. The thermal print head 19 is pressed against the platen roller 18 with the unwound portion of the thermo-sensitive recording paper 16 by means of a spring 20, and the platen roller 18 is driven by a step motor 21 through an endless belt 22. With this structure, an image is recorded on the thermo-sensitive recording paper 16 by the thermal print head 19 and the recorded portion of the recording paper 16 is cut by a cutter 23 to be discharged out of the facsimile machine.

In the illustrated embodiment, the thermo-sensitive recording paper 16 is capable of producing recorded dots of up to three colors. This aspect of the present invention will now be described with reference to FIGS. 3(a) and 3(b). As well known in the art, the thermal print head 19 is typically provided with a plurality of heat-producing elements, such as electrically resistive elements, arranged in the form of a single array at a predetermined pitch which defines the resolution of the thermal print head 19. A drive current pulse is selectively supplied to the array of heat-producing elements in accordance with image information to be recorded, whereby the heat-producing elements are selectively heated to apply a heat pattern to a sheet of thermo-sensitive recording paper on which "burn" points are defined corresponding to the heat pattern to thereby form a recorded image. It is to be understood that only three heat-producing elements 38 are illustrated in FIG. 3(a).

Figure 3A:
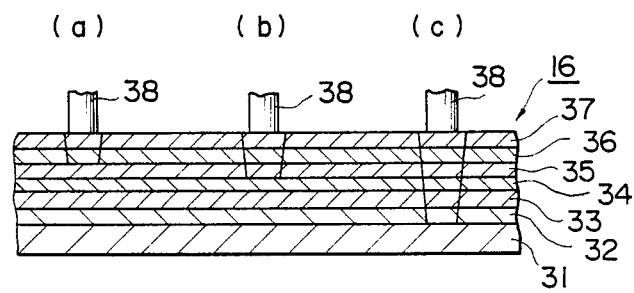
FIGS. 3(a) and 3(b) are schematic illustrations showing how a dot of selected color is printed on a sheet of thermal sensitive paper in the color facsimile machine shown in FIGS. 1 and 2.
Figure 3B:
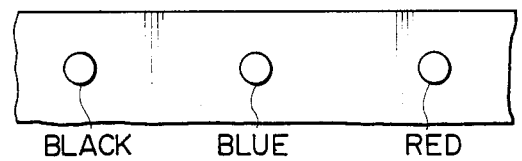

As shown in FIG. 3(a), the thermo-sensitive three-color recording paper 16 is capable of producing recorded dots or pixels of up to three colors, and the recording paper 16 includes a base layer 31, a red color producing layer 32, a blue color suppressing layer 33, a blue color producing layer 34, a black color suppressing layer 35, a black color producing layer 36 and a protective layer 37 formed one on top of another in the order mentioned from bottom to top. The heat-producing elements, such as those 38 shown in FIG. 3(a), come into sliding contact with the protective layer 37 of the recording paper 16.

With such a structure, as shown by (a) in FIG. 3(a), when the heat-producing element 38 is heated to a first predetermined level which supplies a predetermined amount of heat to the black color producing layer 36 through the protective layer 37, a dot or pixel of black color is formed by the black color producing layer 36 of the thermo-sensitive recording paper 16. On the other hand, as shown by (b) in FIG. 3(a), when the heat-producing element 38 is heated to a second predetermined level which supplies a predetermined amount of heat to the blue color producing layer 34 through the black color suppressing layer 35, there is formed a dot or pixel of blue color with the black color cancelled. In addition, as shown by (c) in FIG. 3(a), when the heat-producing element 38 is heated to a third predetermined level which supplies a predetermined amount of heat to the red color producing layer 32 through the blue color suppressing layer 33, a dot or pixel of red color is formed while cancelling blue color. In this manner, by controlling the amount of heat applied to the thermo-sensitive recording paper 16, a dot of selected one of three colors may be formed on the recording paper 16. Since the amount of heat produced by the heat-producing element 38 per unit time is substantially constant, the control of amount of heat produced by the heat-producing element 38 can be carried out by controlling a time period for passing drive current through the heat-producing element 38.

Figure 4:
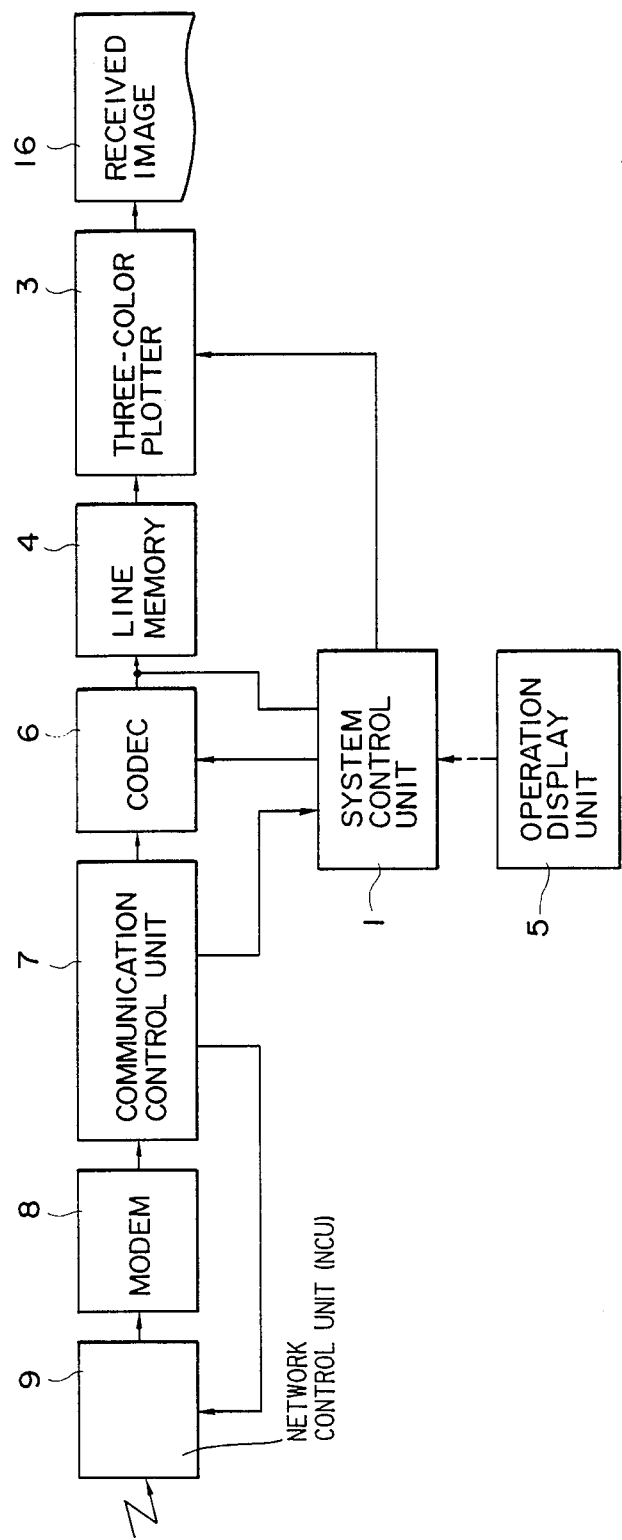
FIG. 4 is a schematic illustration showing in block form the flow of data while the present color facsimile machine operates in a receiving mode.

FIG. 4 illustrates the flow of data while the present color facsimile machine is operating in a reception mode. Upon detection of a call signal from a remote transmitter through the network, the communication control unit 7 controls NCU 9 to establish a connection with the network, thereby executing a predetermined communication control procedure to determine a communication mode. Then, with the thus determined communication mode, image data is received as transmitted. The image data thus received is typically compressed, so that the received image data is passed through the codec 6 to thereby have the received image data decoded, and the thus decoded image data is then temporarily stored in the line memory 4. Then, the image data stored in the line memory 4 is transferred to the three-color plotter 3 where the received image data is recorded on the thermo-sensitive recording paper 16.

Incidentally, the information regarding the characteristic of the transmitting facsimile machine, such as whether it is a monochroic facsimile machine or a color facsimile machine similar to the present facsimile machine, is also received, together with the compression mode of image data and line density, for example, as a part of the information of the transmission mode. And, if the transmitter is, in fact, a monochroic facsimile machine, the present facsimile machine is so structured to carry out recording of received image information with a selected one of three colors, such as "black", "blue" and "red", recordable with the three-color plotter 3. The information recorded by the three-color plotter 3 includes not only image and/or text information, but also ancillary or accompanying information, such as identification information of the transmitter, time of reception, error messages, and management information. In the present facsimile machine, it is so structured that such accompanying information is recorded with a selected one of the above three colors independently of the color selected for recording image or text information.

Thus, in the present facsimile machine, the color to be used for recording image data received from the monochroic transmitting facsimile machine can be set by selecting one of the three predetermined colors as "received image color" and also the color to be used for recording accompanying information can be set by selecting one of the three predetermined colors as "accompanying information color" as desired by manipulating the operation display unit 5. And, the colors thus selected are stored in a non-volatile memory (not shown) provided in the present facsimile machine. In this manner, one or more colors selected for use in recording by the three-color plotter 3 can be set in advance and the set conditions may be maintained unless they are altered or erased.

As shown in the flow chart of FIG. 5, in the case of recording information using the three-color plotter 3, if the information to be recorded is a received image (YES branch of step 41), the system control unit 1 determines the type of image data transmitted from the transmitting facsimile machine (step 42), and, if the transmitter is a color facsimile machine similar to the present color facsimile machine and is going to transmit a three-color image data, the system control unit 1 controls the three-color plotter 3 such that the received image is recorded with predetermined colors. In this case, the image data corresponding to one scan line of an original is transmitted from the transmitter three times. The first image data is a logical sum of "black", "blue" and "red" pixels, the second image data is a logical sum of "blue" and "red" pixels, and the third image data is defined by "red" pixels. And, in front of each pixel data, a data identifying either one of these three is added. Thus, when recording with the three-color plotter 3, drive current is supplied to the heat-producing elements 38 of the thermal print head 19 three times, each time corresponding in level to each pixel of the image data, thereby effecting recording of one line of received image. That is, in accordance with this method, the heat-producing element 38 is heated only once when it records a black dot or pixel on the recording paper 16. Similarly, the heat-producing element 38 is heated twice when it records a blue dot or pixel and three times when it records a red dot or pixel. In this manner, each of the three color pixels is recorded on the recording paper 16 by suitably controlling the amount of heat produced by the heat-producing element 38 (step 43).

On the other hand, in the case where the transmitter is a monochroic facsimile machine (NO branch of step 42), the system control unit 1 controls the three-color plotter 3 such that a received image is recorded with the previously determined "received image color" which has been stored. In this case, the amount of heat produced is controlled by varying the pulse width of drive current to be supplied to the heat-producing element 38 of the thermal print head 19 (step 44). Furthermore, if the information to be recorded is not image information received from the transmitter and is accompanying information, such as time of reception and identification of the transmitter, which is to be recorded together with the received image information by the present facsimile machine (NO branch of step 41), the system control unit 1 controls the three-color plotter 3 to record the accompanying information with the previously determined and stored "accompanying information color" (step 45).

With the above-described structure, by operating as described above while receiving image information, even if the transmitter is a monochroic facsimile machine, the image information may be recorded with a selected color or colors, so that there may be obtained a recorded image which is easy to read. In addition to during reception of image information, at the time of recording error messages after occurrence of abnormal conditions during communication or of recording periodically output management reports, the information is recorded with the color set as "accompanying information color."

As described above, in accordance with the illustrated embodiment of the present invention, the color to be used for recording text or graphic information received from the transmitter is set as "received image color" and the color to be used for recording accompanying information is also set as "accompanying information color" in advance, and, if the transmitter is a monochroic facsimile machine, then a received image is recorded with the "received image color", and any accompanying information, such as time of reception, identification of the transmitter, error messages and management information, is recorded with the "accompanying information color." It should be noted that the number of colors should not be limited only to three as in the above-described embodiment, and the number of colors may be determined as desired. In addition, the present invention can also be applied to a thermal transfer type recording system using plain paper and transferrable inks of different colors.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A color facsimile machine, comprising:
receiving means for receiving information from a transmitter at a remote location;
processing means for processing said information received by said receiving means;
storing means for storing the informaton thus processed by said processing means;
setting means for setting at least one color to be used for recording said information stored in said storing means; and
recording means for recording said information stored in said storing means using said at least one color set in said setting means;
wherein said setting means is also capable of setting a color to be used in recording accompanying information, such as identification of the transmitter and the time of reception of said information, and said recording means records the accompanying information with the color thus set.

2. The color facsimile machine of claim 1, wherein said setting means is capable of setting a multi-color mode in which said recording means records the information stored in said storing means in accordance with the colors of an original image represented by said information.

3. The color facsimile machine of claim 1, wherein said setting means includes a manually operable unit so that any color to be used for recording by said recording means may be set manually.

4. The color facsimile machine of claim 1, wherein said recording means includes a thermal print head and a multi-color heat-sensitive recording paper capable of forming a recorded multi-color image thereon.

5. The color facsimile machine of claim 4, wherein said heat-sensitive paper includes at least two layers each of which forms a dot of predetermined color when heated.

6. The color facsimile machine of claim 5, wherein a color suppressing layer is interposed between each pair of adjacent layers of said at least two layers for cancelling the color produced by one of the pair of layers.

7. The color facsimile machine of claim 4, further comprising controlling means for controlling the operation of said thermal print head such that a degree of heat produced by said thermal print head to record a pixel of said information on said recording paper differs depending on a color to be used for recording the pixel.

* * * * *